Feb. 24, 1970  D. R. DAVIS  3,496,628
METHOD OF JOINING THIN-WALLED MEMBERS, PARTICULARLY
IN CASINGS FOR GAS TURBINE ENGINES
Original Filed April 28, 1965  2 Sheets-Sheet 1
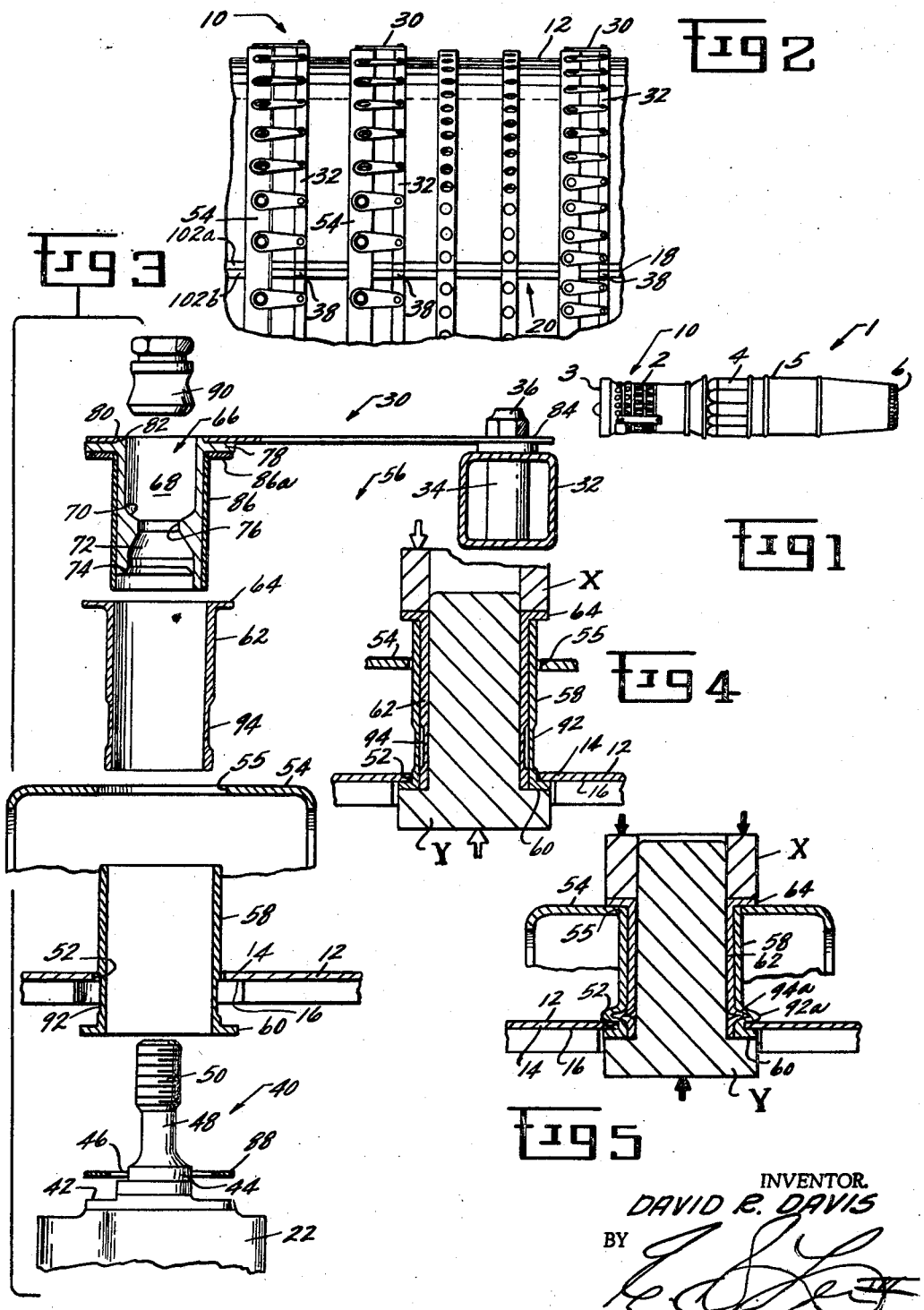
INVENTOR.
DAVID R. DAVIS
BY
ATTORNEY Feb. 24, 1970 D. R. DAVIS 3,496,628
METHOD OF JOINING THIN-WALLED MEMBERS, PARTICULARLY
IN CASINGS FOR GAS TURBINE ENGINES
Original Filed April 28, 1965 2 Sheets-Sheet 2
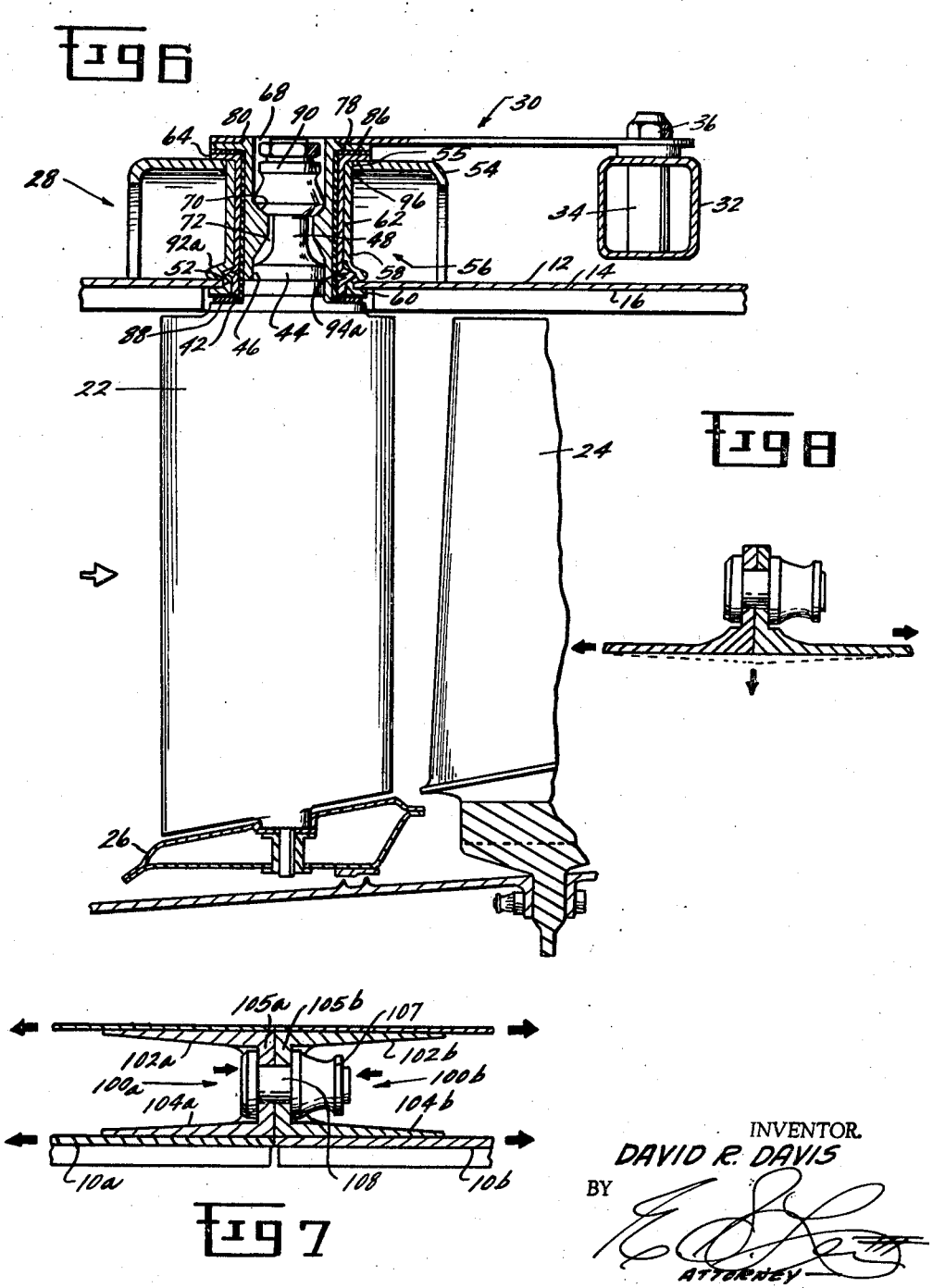
INVENTOR.
DAVID R. DAVIS
BY
ATTORNEY United States Patent Office 3,496,628
Patented Feb. 24, 1970

3,496,628
METHOD OF JOINING THIN-WALLED MEMBERS, PARTICULARLY IN CASINGS FOR GAS TURBINE ENGINES
David R. Davis, Cincinnati, Ohio, assignor, by mesne assignments, to the United States of America
Original application Apr. 28, 1965, Ser. No. 452,457, now Patent No. 3,325,087, dated June 13, 1967. Divided and this application Apr. 17, 1967, Ser. No. 631,204
Int. Cl. B21d *39/00;* B23p *19/04*
U.S. Cl. 29—455                                                     6 Claims

ABSTRACT OF THE DISCLOSURE

The disclosure illustrates a method of forming lightweight stators for gas turbine engines by joining annular stiffening members to a casing through the use of pairs of flanged spools. Each pair of spools is inserted through aligned holes in the casing and stiffening member with the flanges capturing them therebetween. The spools have reduced wall portions adjacent the outer surface of the casing. By exerting a compressive force on the spools the reduced portions are collapsed to grip the spools to the casing and secure the stiffening member thereon.

---

This application is a division of U.S. Patent No. 3,325,087, which issued June 13, 1967.

This invention relates generally to a stator casing construction for gas turbine engines. More particularly, it pertains to a lightweight fabricated stator casing assembly having improved means strengthening the casing and securing stator vanes therewithin and to a method for constructing such a stator casing assembly.

One of the primary objectives of designers of aircraft gas turbine engines is to achieve maximum strength consistent with weight, cost and reliability requirements. Accordingly, more and more use is being made of sheet-metal fabrications in aircraft jet engines, particularly in the construction of the supporting structures, such as the compressor or turbine stator casings. As is well known, these stator casings house relatively high speed rotating parts, the compressor casing, in particular, housing an axial-flow multi-stage rotor having a plurality of rows of airfoils or blades which act in conjunction with interspersed rows of stator airfoils or vanes to raise the pressure of the motive fluid (air) passing through the compressor. An example of this type of apparatus is shown and described in the patent to Howard, 2,610,786, assigned to the present assignee.

In more modern jet engines than that shown in the aforementioned Howard patent, it is desirable to provide means for varying the angle of attack of the stator vanes, in particular, to compensate for decreased stall margin or, i.e., take advantage of, the increased ram (inlet) air pressure with increased flight speeds. Examples of jet engine compressors of axial-flow variable stator vane design will be found in the patents to Neumann, 2,933,234, and Balcom et al. 2,936,108, both assigned to the present assignee. As more fully explained in Balcom et al., more power can be obtained from a gas turbine engine by providing a higher pressure ratio compressor for the engine. However, whenever a conventional high pressure ratio compressor with fixed stator vanes is used, stall characteristics occur during various part speed conditions. This is due to the fact that when a compressor is designed for a high speed, high pressure operating condition, the stator vanes are designed to have a particular angle of attack to give the most efficient operation at that particular operating condition. During starting or at some part speed condition the angle of attack of the front rows of vanes will become mismatched from the rows of vanes in the rear of the compressor if the stator vanes are fixed and thereby create stall. In other words at the part speed or starting condition the rear stages cannot take the quantity of air that is being passed to it by the front stages. Accordingly, back pressure is built up so as to choke the compressor. In order to prevent this stall characteristic from occurring adjustable stator vanes can be provided so that at the starting or part speed condition the front stages can be closed down with respect to the rear stages and thereby provide the correct airfoil orientation angle for the particular velocity of flowing air. By this means, the operating characteristics of the compressor are improved under certain operating conditions since the direction and quantity of air flow is changed to correspond to the angle of attack of the stator vanes. This change in air flow has a direct bearing on the stall characteristics of an axial flow compressor.

By making an engine construction heavy enough from a structural standpoint, the approach to the stall region of a compressor will not significantly affect its operation. For example, the approach to the stall region of a compressor excites or creates pressure surges which result in large vibrations in the structural components of the compressor. If the structural members are sufficiently heavy, they can withstand these large vibrations. However, a gas turbine engine having a good power to weight ratio results in an air frame having the capability of either carrying more gas or more pay load. A heavy structurally built jet engine cannot obtain this good power to weight ratio. However, in order to provide the best power to weight ratio of a jet engine it is very important that the engine be made as light as possible. The problem of approaching a stall region then takes on added significance. The use of variable stator vanes, therefore, while beneficial somewhat complicates the compressor aerodynamic and mechanical design problems, but I have discovered that it also offers an opportunity to improve the construction of the stator casing.

A further object of my invention is to provide a new and improved method for assembling lightweight components and particularly stator casings for gas turbine engines of the type having fixed and variable stator vanes.

In carrying out my invention in one form thereof, I provide an improved stator assembly, which is separately claimed in the above-referenced copending application. The main structural member of this improved stator assembly is a lightweight stator casing having a plurality of circumferentially spaced openings formed in it. A plurality of stator vanes are disposed within the casing and are provided with mounting studs which extend outwardly through the openings. At least one annular stiffening member is positioned around the casing for strengthening the casing against flexure during operation of the engine. The stiffening member has a plurality of openings radially aligned with the openings in the casing so as to accommodate the mounting studs of the stator vanes as they extend out of the casing, and, by my invention, an improved means is provided for both securing the stiffening member to the casing and for journaling the mounting studs of at least some of the stator vanes in the aligned openings of the stiffening member and the casing for relative turning movement with respect thereto. This means, in one preferred form thereof, comprises a plurality of pairs of inner and outer telescopically arranged bushing members which are located within and extend between the respectively aligned openings of the casing and the stiffening members. A flange is provided on both the inner and the outer bushing members, the flange on the outer member engaging the inner surface of the casing while the flange on the inner member engages the outer surface of the stiffening member. Further, the bushing members of each pair include interlocked circumferentially enlarged portions or collars at the outer casing surface adjacent the openings thereof. The combination of the enlarged portions or collars of the bushing members, together with the inner and outer flanges both locks the bushing members in place on the casing and fixedly locates the stiffening member therearound. Additionally, the inner bushing members form journaling surfaces for rotatably mounting the studs of the variable stator vanes, and thereby my improved structure serves the dual function of both strengthening the lightweight casing and mounting the variable stator vanes.

In a preferred method for forming the lightweight stator assembly, the bushing members are provided with sections of reduced thickness and these sections are collapsed outwardly by a compressive force applied to the bushing members so as to form the interlocking collars on the outer surface of the casing.

Other objects and advantages of the method and means of the invention will be apparent from the following detailed description and claims and from the accompanying drawings, all of which describe by way of illustration only and without limitation what is now considered to be a preferred embodiment of the invention.

FIGURE 1 is an exterior pictorial view of an axial-flow aircraft gas turbine including a compressor section constructed according to the invention.

FIGURE 2 is an enlarged, partial view of the exterior of the compressor casing illustrating the placement of the casing stiffening means and the means for actuating the variable stator vanes.

FIGURE 3 is an enlarged, exploded view, partially in cross-section, of the details of the casing wall strengthening and variable stator vane support means of the invention.

FIGURES 4 and 5 illustrate schematically a preferred method of assembly of means shown in FIGURE 3.

FIGURE 6 is an assembly view, in cross-section, of one of a row of variable stator vanes, illustrating the means for strengthening the sheetmetal casing and supporting the variable stator vanes, according to the invention.

FIGURE 7 illustrates improved means for strengthening the casing when the casing is axially split along a horizontal line.

FIGURE 8 illustrates conventional flange means.

Referring first to FIGURE 1, indicated generally at 1 is an aircraft gas turbine engine having an axial-flow compressor 2. The compressor includes an inlet 3 through which motive fluid (air) is taken into the engine to be compressed by the compressor. The air then passes downstream from the compressor into combustion chambers 4 for burning with fuel to increase its velocity before it is passed through a turbine 5, at which point energy is taken out of the now hot gas stream to drive the compressor. The motive fluid finally is discharged in the form of a propulsive gas stream from a jet exhaust nozzle 6.

The compressor 2 includes a casing assembly, indicated generally at 10 in FIGURE 2, having an outer wall 12 of relatively thin sheetmetal construction for reduced weight in keeping with the design objectives of today's modern jet engines. The outer wall, as seen more clearly in FIGURE 6, has an outer surface 14 and an inner surface 16, the latter forming the outer flow path boundary for confining the engine motive fluid. For convenience of assembly and repair, particularly of the compressor, it may be desirable to form the casing 10 in sections along a horizontal split-line, indicated at 18. In this case, as illustrated, flange means, indicated generally at 20, are provided along the casing section edges for securely fastening the sections into a pressure tight vessel.

The axial-flow compressor includes a series of stages or row of stator vanes, some of which are variable as shown at 22 in FIGURE 6, followed by rows of rotating airfoils, one of which is partially shown at 24. In the case of the variable stator vanes, in particular, it is desirable to provide support at the vane tip ends in the form of annular shroud means, as indicated at 26. At the other end of the variable vanes 22, i.e., the stub or root ends, there is provided the improved variable vane supporting and casing stiffening means, of the present invention, indicated generally at 28 in the drawings. Means are provided for rotating the vanes 22 about their longitudinal axes, and this means includes a lever arm, indicated at 30. The lever arm 30 is loosely connected to an actuating member, in this case a half-ring 32, by a pin 34 threaded at one end to engage a nut 36. Control means (not shown) are provided to rotate the half-rings which are joined by means 38, as seen in FIGURE 2. The half-rings rotate circumferentially about the casing for tangential movement of lever arms 30 and, thus, turning movement—in a radial plane—of the stator vanes. A complete control mechanism for varying stator vanes is more fully described in each of the aforementioned Neumann and Balcom patents.

As seen in detail in FIGURES 3 and 6, each vane root or stub end, indicated generally at 40, comprises a thrust bearing surface 42, a stub or platform portion 44 having a machined flat at 46, a reduced neck portion 48, and a threaded portion 50. The vane stub end is adapted to fit through a hole 52 provided in the casing wall 12, there being a circumferentially extending row of equi-spaced openings or holes to receive a row of vanes for each stage of the compressor.

Turning now more specifically to the improved strengthening and vane supporting means of the invention, the several components of a disclosed embodiment of the variable vane support and casing wall stiffening means 28 are shown in an enlarged exploded assembly view in FIGURE 3, the components being shown fully assembled in FIGURE 6. It will be understood that while the preferred form of the invention is illustrated using a variable stator vane, the invention will have equal utility for fixed, i.e., non-variable, stator vanes. There is provided for each row of variable vanes 22 a stiffening member or band 54, preferably channel-shaped in cross-section for added rigidity. Band 54 includes a plurality of openings or holes 55 therethrough of approximately equal size to the casing holes 52. Holes or openings 52 and 54 are so spaced and arranged circumferentially of the band and wall members, respectively, as to form aligned outer and inner pairs of openings having their centers on the same radial line with respect to the casing axis. As the vane longitudinal axis will be substantially co-linear with the center line through a pair of such holes, vane centering is facilitated. There is thus little chance of binding or unnecessary friction as the angle of attack of the vane is varied with respect to the motive fluid as it flows through the compressor in the direction indicated by the large arrow in FIGURE 6.

By my invention, means are provided to maintain the vane stub end 40 within the pairs of aligned holes while at the same time adding strength to the casing wall in cooperation with the plurality of axially-spaced stiffening bands 54. As indicated generally at 56, this means comprises a double spool or bushing assembly including telescopically arranged bushings or spool members 58 and 62. The bushing assembly includes a flange at each end thereof; specifically, in the illustrated embodiment an outer flange 64 is formed on the inner bushing 62 and an inner flange 60 is formed on the outer bushing 58. As seen in the drawings flanges 60 and 64 extend outwardly and are preferably circular (annular), each having a diameter greater than the respective casing and band holes 52 and 54.

As will be more fully described hereinafter, the flanges 60 together with circumferentially enlarged interlocked portions 92a and 94a of the bushings and flange 64 secure the bushing assembly in the casing hole 52, and fixedly locate the stiffening band on the bushing assembly around the casing.

In accordance with a further aspect of the invention, means are provided to mount the stub end within the double spool assembly. The mounting means include a fastening or cup member indicated generally at 66. Member 66 has a first recess or cavity 68 opening outwardly of the casing assembly, this outer cavity 68 including a seat portion 70. Inwardly of the seat portion is a second recess or cavity 72, which opens opposite to the first recess, this second recess having a flat or keyed wall portion at 74. The recesses or cavities 66 and 72 are joined by a neck portion 76 adapted to pass the threaded portion 50 of the vane stub end. The cup or fastening member is machined at 80 to provide a seat for one end of lever arm 30. This end of the arm preferably includes a hole 82 adapted to fit closely on the seat 80 around its central boss where the arm may be secured by brazing, or an equivalent metal joining arrangement. Likewise the other, or half-ring, end of lever arm 30 has a hole 84 for pin 34. Bearing means in the form of a carbon sleeve 86 and surface 86a are provided along with a washer 88 to facilitate relative movement between the cup member 66 and bushing assembly when they are assembled together securely. The cup member is held in the bushing assembly by means of a controlled-torque nut 90 which is threaded on the vane stub portion 50 and which rests on inclined seat 70 in the outer recess or cavity 68. Use of the hole 82 and seat 80 arrangement facilitates use of the disclosed torque-controlled fastening means which is intended to prevent damage to the relatively expensive vanes 22 and somewhat fragile sheet metal parts of the vane support and casing stiffening means 28.

It will be seen that when the casing assembly is completed as shown in FIGURE 6, the variable stator vanes 22 are journaled by means of the bushing assembly 56. Specifically, the vanes are mounted within the cup members 66 and due to the engaging flats 46 and 74 on the vane stub member, respectively, the vane and cup members rotate together being journaled within the inner bushing 62. The carbon sleeve 86 serves to reduce the friction between the cup member and bushing.

Prior to final assembly of the variable stator vanes within the casing 10, and in accordance with a preferred embodiment of the method of constructing the improved lightweight stator casing assembly disclosed herein, it will be necessary to fixedly locate the stiffening means or bands 54 with respect to the casing. A preferred method of assembly is as follows. With the cylindrical sheet-metal wall member 12 formed and retained in a fixture, a number of pre-formed (in channel section) annular bands 54 are spaced axially along the casing wall and retained in another fixture so as to be concentric with the casing and radially spaced from the outer surface 14 of the wall 12. Preferably holes 52 and 54 are then drilled in the casing and band members, respectively, the drill being centered on radial lines with respect to the casing axis. Obviously, the drilling may be done from outside or inside the casing. Also, the holes could be appropriately dimensioned and located prior to fixturing the pieces and then aligned in pairs when the casing member and bands are brought together.

In any event, with the casing and band holes provided and aligned in pairs, pre-formed spool or bushing members 58 and 62, provided with circumferentially reduced wall portions at 92 and 94, respectively, are assembled with the fixtured casing and band pieces in the following manner. Spool or bushing member 58 is passed outwardly through the casing hole 52—the non-flanged end first—until that end extends into the stiffening member opening 55, i.e., until locating flange 60 abuts the inner surface 16 of the casing wall 12. The bushing will be cut off flush at the band 54 or, in the preferred arrangement, the length will have been predetermined by the spacing between the band and casing surface and the thickness of the band. Next, the second or inner bushing 62, sized to have an O.D. just lightly smaller than the first bushing I.D., is telescoped within the first bushing, the locating flange 64 at the outer end retaining the second bushing at the level of the band 54. Again, the inner or other end of the bushing is cut off, or the bushing is pre-formed to have the desired length. The reduced wall portions 92a and 94a located, respectively, adjacent the flanged end and the non-flanged end of bushing members 58 and 62, also respectively, will now be in juxtaposition. By application of equal but opposing forces the nestled bushing walls are now in a position to be collapsed—at the reduced portions thereof—to fixedly locate the wall and stiffening band members with respect to each other. Thus, as shown in the schematic illustrations of FIGURES 4 and 5, force is applied parallel to the radial or hole center line (co-linear with the bushing center lines) to force the walls outwardly into the circumferentially enlarged collar configuration, indicated at 92a and 94a. In cooperation with flanges 60 and 64 this arrangement secures the bushing assembly and the sheet-metal annular stiffening band members 54 in place whereby the latter members stiffen the sheet-metal casing wall 12. To prevent unwanted stress and ensure the forces being applied are co-linear to the axis of the double bushing or spool assembly, die or arbor "Y" may be inserted in the inner bushing 62 for support of the inner bushing walls and the outer bushing flange 60 during the collapsing operation. In conjunction with the arbor, an annular or ring die "X" may be utilized which will be sized to apply force to the flange 64. The die "X" preferably will include a hole adapted to receive the arbor "Y," as shown, for further ensuring the correct line of direction of the collapsing forces indicated by the large arrows in the drawings.

In order to further strengthen the casing wall when it is split at 18 to facilitate repair and assembly, by my invention there is provided a double H shaped flange arrangement which may be used in combination with the stiffening bands 54, as shown in detail in FIGURES 5 and 6. Thus, flange means 20 comprises a mirror-image pair of generally U-shaped, in cross-section, flange members indicated generally at 100a–100b for casing sections 10a and 10b, respectively. As shown, the flange members have thickened, generally triangular, or web-shaped arms 102a–104a and 102b–104b, respectively, the arms of each flange being joined by center sections 105a–105b forming the bottom of the U or, in abutment as shown in the drawings, the web of the H. The arms 104a and 104b may be butt-welded to the casing section edges or brazed to the casing in an overlapping relationship, as shown. A nut 107 and bolt 108 fastening arrangement may be used to complete the assembly. The channel section band members are also brazed to the H-shaped flange assembly where the bands cross the split-line, as shown in FIGURE 2.

The primary advantage of this arrangement is the elimination of the distortion phenomenon present in the usual flange design, i.e., simple L-shaped flanges butted and joined by fastening means as shown in FIGURE 8. In the usual construction the pressure loads cause stresses tending to separate the heel of the flanges at the casing split-line. Since the fastening means restrains the load, the result is a moment of force at the flange tending to distort the casing inwardly, as seen in dotted lines in FIGURE 8. With the arrangement shown in FIGURE 7 on the other hand, the outer bands 54 are positioned by arms 102a–102b, substantially equal in size and strength to arms 104a–104b, which forces the outer bands to share the tensile pressure or hoop stresses. The resultant forces tend to be equalized in the direction shown by the arrows in FIGURE 7. In this manner, the overturning moments and the resultant radial deflection of the casing wall is reduced or eliminated.

When particular embodiments of the means and method of the present invention have been disclosed, it will be obvious to those skilled in the art that various changes and modifications may be made in the embodiments thereof without departing from the spirit or scope of the invention, and it is therefore intended in the appended

Having thus described the invention, what is claimed as novel and desired to be secured by Letters Patent of the United States is:

1. A method of joining a tubular assembly to a thin-walled member and maintaining two thin-walled members in spaced relationship, comprising the steps of:

inserting a flanged spool through an opening in one thin-walled member with the flange engaging one surface thereof, said spool having a portion of reduced wall thickness adjacent the other surface of said one thin-walled member, inserting a second flanged spool through an opening in the other thin-walled member with the flange thereof engaging the outer surface of said other thin-walled member, telescoping said second spool within said first spool and aligning a portion of reduced wall thickness intermediate its ends with the corresponding portion of said first spool and with the flange of the second spool engaging the end of said first spool, and exerting a comprehensive force on the flange of said second spool and the flange of said spool as well as the end of said second spool, to collapse the reduced portions thereof into interlocking relation with each other and with said other surface of the first thin-walled member.

2. A method as in claim 1 comprising the additional step of inserting a closely fitting arbor into said second spool prior to exerting said compressive force.

3. A method as in claim 1 employed to form a lightweight stator casing for a gas turbine engine wherein the first member is a casing and the second member is an annular stiffening member and comprising the further step of, registering holes in the stiffening member with a series of circumferentially spaced holes in the casing, and inserting spools through said holes and compressing them in the same fashion spools were inserted and compressed in connection with the first mentioned holes, whereby the casing and annular member form a rigid and lightweight structure.

4. A method as in claim 3 comprising the additional step of, inserting a closely fitting arbor into each second spool prior to exerting said compressive force.

5. A method as in claim 4 further comprising, removing the arbor from each second spool after exerting said compressive force and rotatably mounting a stator vane in each second spool which serves as the journal therefor.

6. A method as in claim 1 comprising, the additional steps of inserting an additional pair of spools corresponding to said first and second spools through openings in said first and second thin-walled members at an angle to said first and second spools and then exerting a compressive force on said additional pair of spools as in claim 1.

References Cited

UNITED STATES PATENTS

| | | | |
|---|---|---|---|
| 2,409,352 | 10/1946 | Gill | 85—70 |
| 2,562,336 | 7/1951 | Selden. | |
| 2,572,246 | 10/1951 | Colley et al. | 85—70 |
| 3,197,854 | 8/1965 | Rohe et al. | 29—523 X |

CHARLIE T. MOON, Primary Examiner

U.S. Cl. X.R.

29—509, 507, 523; 85—70; 230—114; 52—617